United States Patent [19]

Planeta

[11] Patent Number: 5,441,395
[45] Date of Patent: Aug. 15, 1995

[54] TUBULAR PLASTIC FILM EXTRUSION APPARATUS WITH IMPROVED ADJUSTABLE SIZING CAGE

[76] Inventor: Mirek Planeta, 170 Traders Blvd., Mississauga, Ontario L4Z 1W7, Canada

[21] Appl. No.: 264,123

[22] Filed: Jun. 22, 1994

[51] Int. Cl.⁶ .............................................. B29D 23/00
[52] U.S. Cl. ................ 425/72.1; 425/326.1; 425/387.1; 425/394
[58] Field of Search ................ 425/72.1, 326.1, 387.1, 425/394

[56] References Cited

U.S. PATENT DOCUMENTS

| | | | |
|---|---|---|---|
| 3,749,540 | 7/1973 | Upmeier | 425/72.1 X |
| 3,930,781 | 1/1976 | Upmeier | 425/326.1 |
| 3,980,418 | 9/1976 | Schott, Jr. | 425/72.1 |
| 4,355,966 | 10/1982 | Sweeney et al. | 425/72.1 X |
| 4,479,766 | 10/1984 | Planeta | 425/72.1 |
| 4,749,346 | 6/1988 | Planeta | 425/72.1 |
| 4,793,790 | 12/1988 | Reinhold | 425/387.1 X |
| 4,815,957 | 3/1989 | Schnell et al. | 425/72.1 X |

Primary Examiner—Richard L. Chiesa
Attorney, Agent, or Firm—Rogers & Scott

[57] ABSTRACT

Tubular plastic film extrusion apparatus includes an extruder for extruding tubular plastic film in an upwards direction, and an adjustable sizing cage above the extruder and surrounding the tubular film.

A collapsing frame is located above the sizing cage for collapsing the tubular film to sheet form and trapping air in the tubular film therebelow. The sizing cage has a series of adjustable sizing assemblies circumferentially spaced around the tubular film. Each sizing assembly includes a vertical arm support carrying vertically-spaced horizontally-extending sizing arms engageable with the tubular plastic film, upper and lower parallel levers pivotally connected at inner ends to the vertical arm support and at opposite ends to a fixed location, and an adjuster operable to pivot the upper and lower levers upwardly to cause upward and outer movement of the vertical arm support and the sizing arms carried thereby and to pivot the upper and lower arms downwardly to cause downward and inner movement of the vertical arm support and the sizing arms carried thereby.

2 Claims, 3 Drawing Sheets ns 5,441,395

TUBULAR PLASTIC FILM EXTRUSION APPARATUS WITH IMPROVED ADJUSTABLE SIZING CAGE

This invention related to apparatus for the production of tubular plastic film and in particular to the adjustable sizing cage of such apparatus, the sizing cage being adjustable in diameter in accordance with the diameter of the tubular film being produced.

Tubular plastic film extrusion apparatus with an adjustable sizing cage is described in my prior U.S. Pat. No. 4,479,766 issued Oct. 30, 1984, the contents of which are hereby incorporated herein by reference. The sizing cage described in my prior patent is suitable for tubular film diameters up to about 80 inches. However, this prior art sizing cage is not particularly suitable for larger film diameters because problems such as vibration occur during use.

It is therefore an object of the present invention to provide tubular plastic film extrusion apparatus with an improved adjustable sizing cage which is more suitable for the production of larger diameter tubular film.

According to the present invention, tubular plastic film extrusion apparatus comprises an extruder for extruding tubular plastic film in an upwards direction, an adjustable sizing cage above the extruder and surrounding the tubular film, and a collapsing frame above the sizing cage for collapsing the tube to sheet form and trapping air in the tubular film therebelow. The sizing cage has a series of adjustable sizing assemblies circumferentially spaced around the tubular film, each sizing assembly including a vertical arm support carrying vertically-spaced horizontally-extending sizing arms engagable with the tubular plastic film, upper and lower parallel levers pivotally connected at inner ends to the vertical arm support and at opposite outer ends to a fixed location, and an adjuster operable to pivot the upper and lower levers upwardly to cause upward and outer movement of the vertical arm support and the sizing arms carried thereby and to pivot the upper and lower levers downwardly to cause downward and inner movement of the vertical arm support and the sizing arms carried thereby.

Each adjuster may comprise a vertically extending fixed rod, a sleeve slidably mounted on the rod, and a cam carried by the sleeve and engaging one of the levers whereby upward movement of the sleeve on the rod causes upward pivotal movement of the levers and vice-versa.

BRIEF DESCRIPTION OF THE DRAWINGS

One embodiment of the invention will now be described, by way of example, with reference to the accompanying drawings, of which.

DETAILED DESCRIPTION OF THE PREFERRED EMBODIMENT

Figure 1:
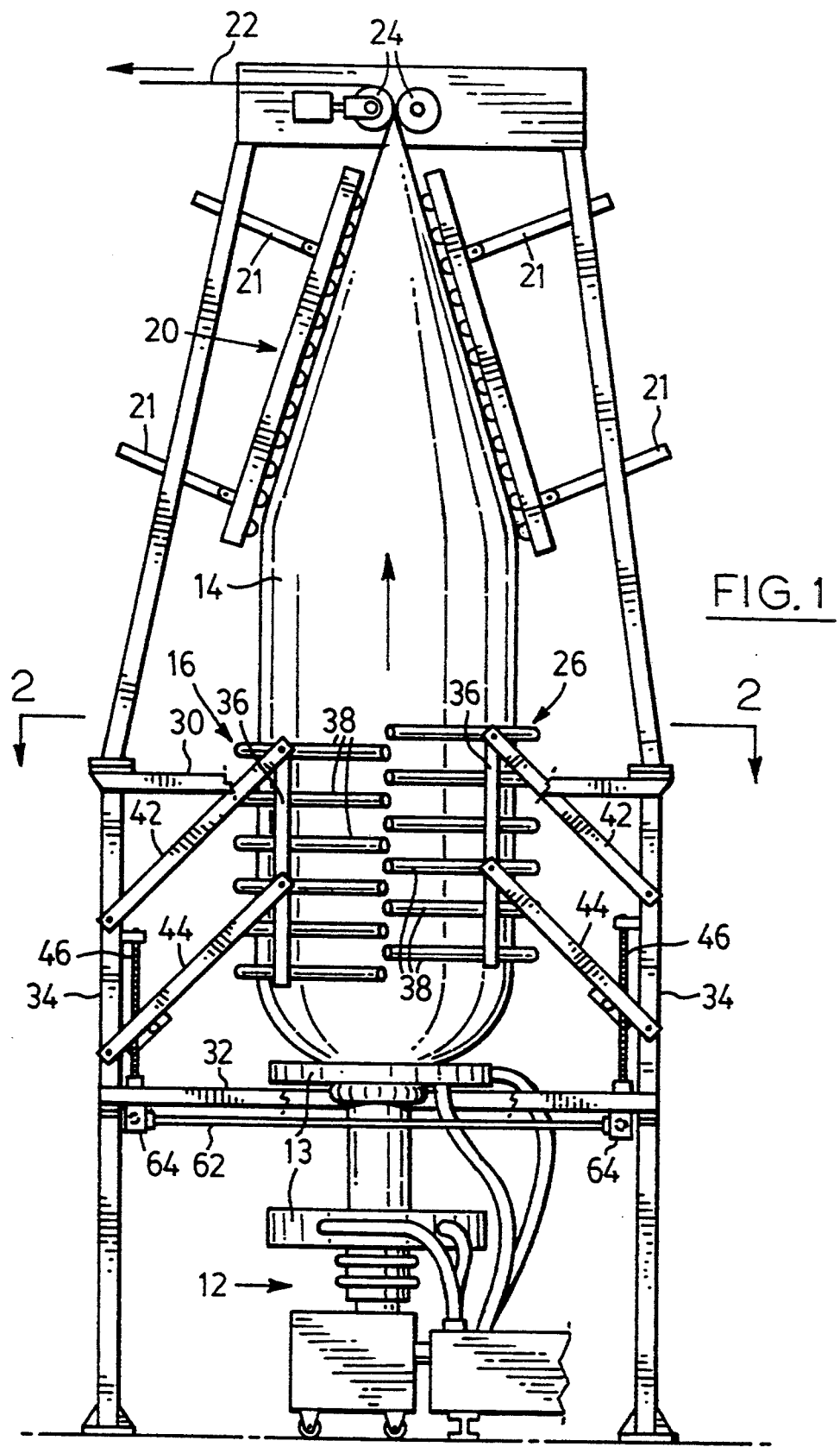
FIG. 1 is a diagrammatic side view of tubular plastic film extrusion apparatus with an improved sizing cage in accordance with the invention.

Referring to the drawings, tubular plastic film extrusion apparatus comprises (see especially FIG. 1) an extruder 12 for extruding tubular plastic film 14 in an upwards direction. An adjustable sizing cage 16 in accordance with this embodiment of the invention is carried by a main frame 18 at a position above the extruder 12 and surrounds the tubular film 14. One or more air-emitting cooling rings may surround the tubular film 14 between the extruder 12 and the sizing cage 16 in a manner well known in the art. A collapsing frame 20 is carried by the main frame 18 (by means of attachments not shown) at a position above the sizing cage 16 and operates to collapse the tubular film 14 to sheet form, at the same time trapping air in the tubular film therebelow so that a film bubble is formed between the extruder 12 and the collapsing frame 20. After leaving the collapsing frame in sheet form, the sheet form 22 passes between two rollers 24 to further processing.

Figure 2:
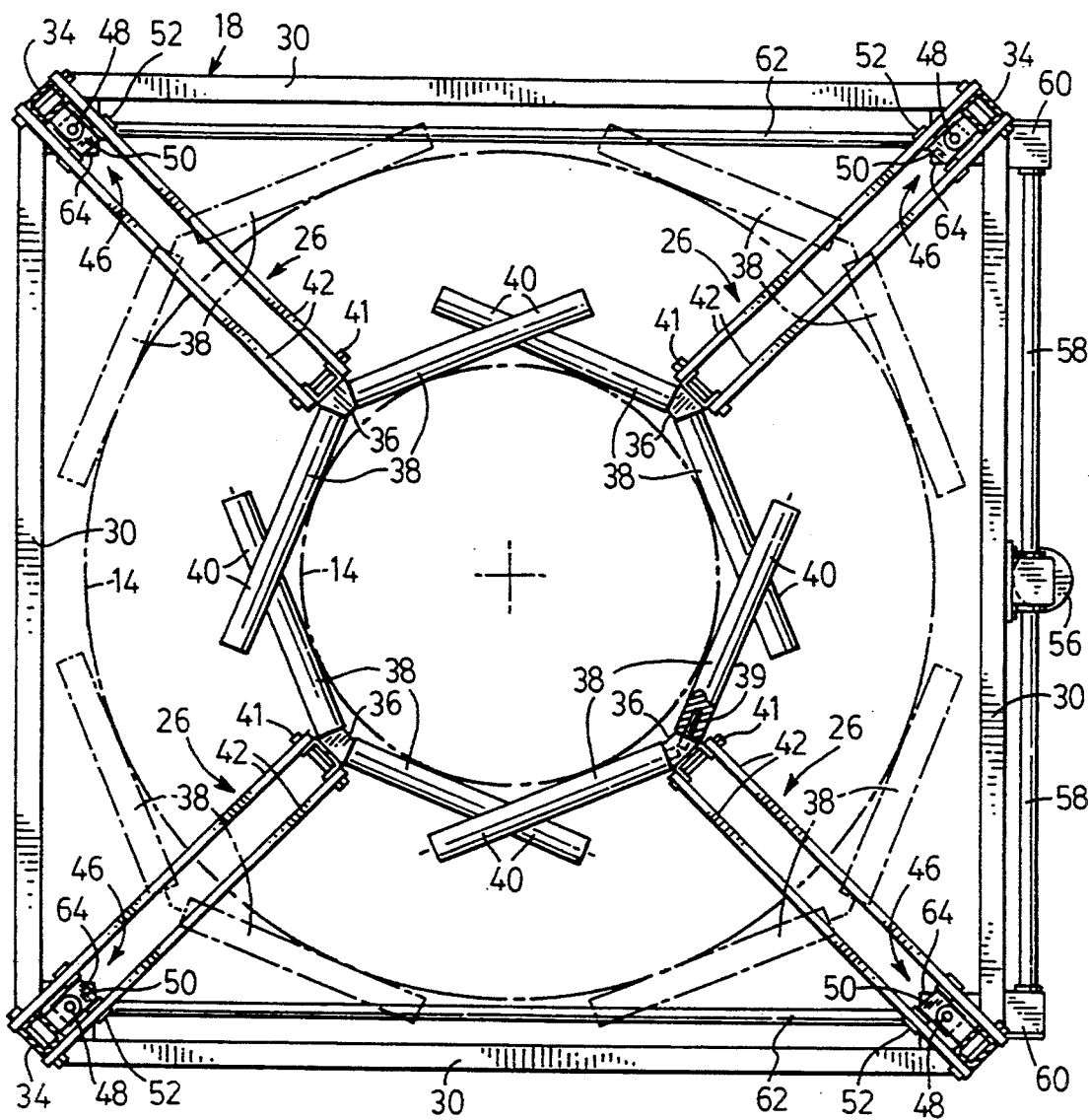
FIG. 2 is an enlarged horizontal sectional view of the sizing cage taken generally along the line 2—2 of FIG. 1.
Figure 3:
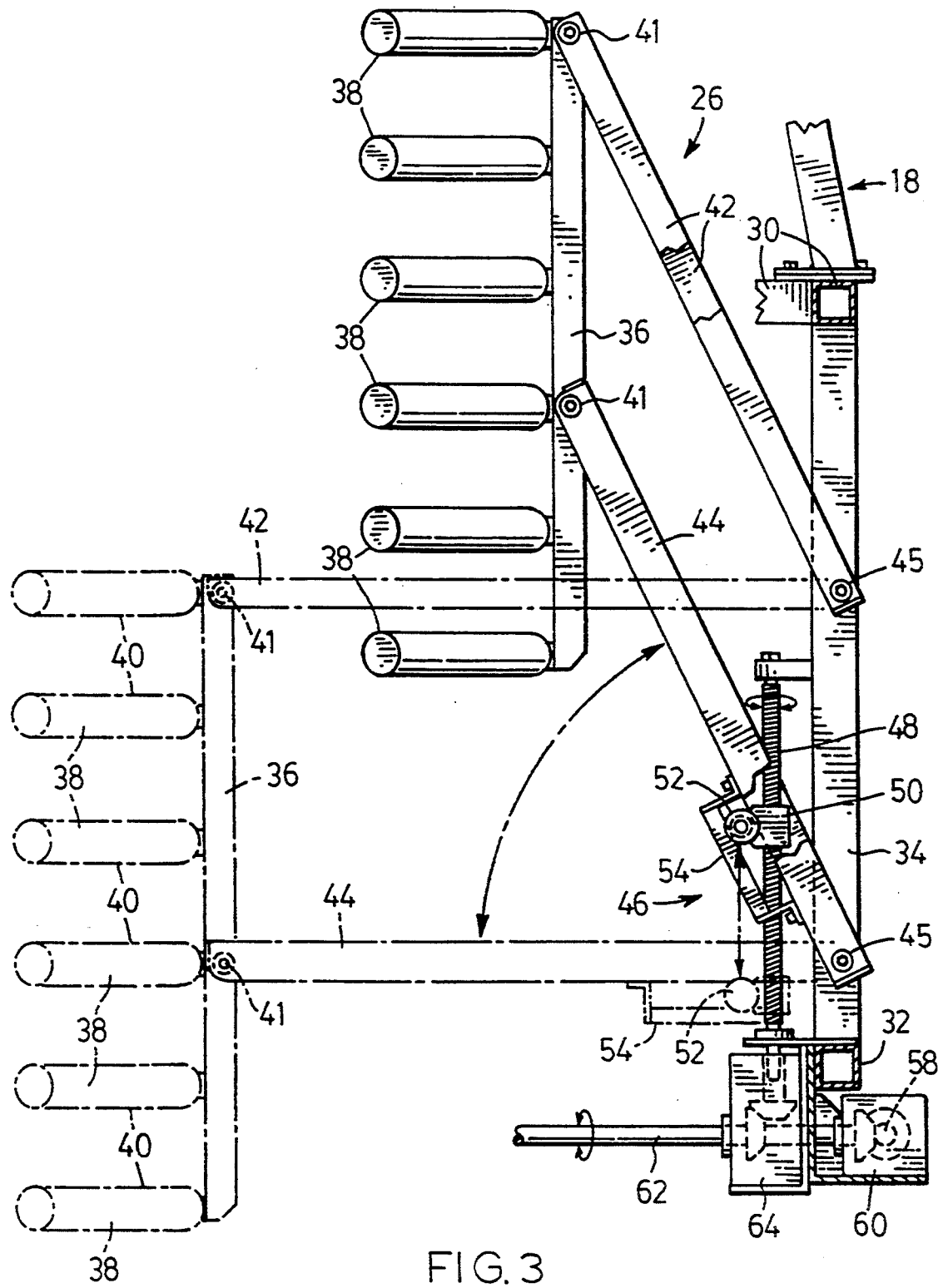
FIG. 3 is a side view, partly in section, of one of the adjustable sizing assemblies of the sizing cage showing the sizing arms upper and lower positions for larger and smaller film diameters respectively.

As shown more particularly in FIGS. 2 and 3, the sizing cage 16 comprises four adjustable sizing assemblies 26, one at each corner of a sub-frame 28 which as shown in FIG. 2 is square in plan view. The sub-frame 28 is appropriately secured to the main frame 18 and has upper and lower horizontal frame members 30, 32 connected at the corners by vertical frame members 34.

Each adjustable sizing assembly 26 has a vertical arm support 36 carrying six vertically-spaced horizontally-extending pairs of sizing arms 38 engageable with the tubular plastic film 14. Each sizing arm 38 carries a roller 40 rotatably mounted on a spindle (41) extending from the vertical arm support 36 in a manner which will be readily apparent to a person skilled in the art, the rollers 40 of the sizing assembly 26 operating to engage and control the diameter (i.e. size) of the tubular film bubble 14 as indicated in FIG. 2.

The vertical arm support 36 of each adjustable sizing assembly 26 is pivotally mounted on the inner ends of upper and lower parallel levers 42, 44 respectively whose opposite outer ends are pivotally connected to the vertical frame member 34. There are two laterally spaced upper levers 42 and two laterally spaced lower levers 44 pivotally mounted on opposite sides of the vertical arm support 36 and the vertical frame member 34. The upper and lower levers 42, 44, the vertical arm support 36 and the vertical frame member 34 form a parallelogram linkage.

An adjustor 46 operable to pivot the upper and lower levers 42, 44 upwardly and downwardly has a vertically extending rod 48 appropriately secured at its upper and lower ends to the vertical frame member 34 and the lower horizontal frame member 32. A sleeve 50 is slidably mounted on the vertical rod 48 and carries a cam in the form of two rotatable rollers 52 which engage the lower surfaces of the lower levers 44. The rollers 52 are retained in engagement with the levers 44 by an elongated guide 54 secured thereto. A guide frame 56 (shown only in FIG. 3 is secured to sub-frame 28 on each side of the levers 42, 44 to guide the levers in a vertical path during upward and downward movement thereof.

In operation of the sizing cage, when it is desired to vary the diameter of the plastic film bubble 14, the four adjusters 46 are simultaneously adjusted by moving the sleeves 50 upwardly or downwardly. Upward movement of the sleeve 50 causes the cam rollers 52 to pivot the levers 42, 44 upwardly, hence moving the vertical arm support 36 and sizing arms 38 upwardly and outwardly to increase the film diameter. Downward movement of the sleeve 50 causes the cam rollers 52 to allow the levers 42, 44 to pivot downwardly, thereby allowing the vertical arm supports 36 and sizing arms 38 downwardly and inwardly to decrease the film diameter. FIG. 3 shows the minimum diameter of the sizing assembly with the levers 42, 44 horizontal and a maximum diameter with the levers 42, 44 at a raised angle to the horizontal of approximately 60°. A minimum diameter may for example be about 64 inches and the maximum diameter about 128 inches, with the vertical travel of the vertical arm support 36 being about 54 inches.

As will now be readily appreciated by a person skilled in the art, a sizing cage in accordance with the invention is more satisfactory for larger film diameters, i.e. with less likelihood of vibration, than the arrangement described in my prior patent.

Also, the sizing arms are higher for larger diameters, i.e. higher frost lines, and vice-versa. There is consequently no need to provide separate elevating mechanism for the sizing cage, thereby reducing cost.

Other embodiments will also be readily apparent to a person skilled in the art, the scope of the invention being described in the appended claims.

I claim:

1. Tubular plastic film extrusion apparatus comprising:

an extruder for extruding tubular plastic film in an upwards direction, an adjustable sizing cage above the extruder and surrounding the tubular film, a collapsing frame above the sizing cage for collapsing the tubular film to sheet form and trapping air in the tubular film therebelow, said sizing cage having a series of adjustable sizing assemblies circumferentially spaced around the tubular film, each sizing assembly including a vertical arm support carrying vertically-spaced horizontally-extending sizing arms engageable with the tubular plastic film, upper and lower parallel levers pivotally connected at inner ends to the vertical arm support and at opposite ends to a fixed location, and an adjuster operable to pivot the upper and lower levers upwardly to cause upward and outer movement of the vertical arm support and the sizing arms carried thereby and to pivot the upper and lower arms downwardly to cause downward and inner movement of the vertical arm support and the sizing arms carried thereby.

2. Apparatus according to claim 1 wherein each adjuster comprises a vertically extending fixed rod, a sleeve slidably mounted on the rod, a cam carried by the sleeve and engaging one of the levers whereby upper movement of the sleeve on the rod causes upward pivotal movement of the levers and vice-versa.

* * * * *